United States Patent [19]
Harmon

[11] Patent Number: 4,826,221
[45] Date of Patent: May 2, 1989

[54] TENSION AND SHEAR LATCHING MECHANISM

[75] Inventor: Raymond E. Harmon, Orange, Calif.

[73] Assignee: Hartwell Corporation, Placentia, Calif.

[21] Appl. No.: 34,325

[22] Filed: Apr. 3, 1987

[51] Int. Cl.$^4$ .............................................. E05C 1/12
[52] U.S. Cl. .................. 292/167; 292/341.15; 292/150; 292/106
[58] Field of Search ................ 292/341.15, 302, 106, 292/150, DIG. 4, 167, 341.16, 341.17, 333, 179

[56] References Cited

U.S. PATENT DOCUMENTS

| | | | |
|---|---|---|---|
| 112,635 | 8/1871 | Robinson | 292/106 |
| 720,673 | 2/1903 | Collins | 292/106 |
| 1,026,365 | 5/1912 | Pfleghar | 292/106 |
| 1,086,365 | 2/1914 | Hendren | 292/341.15 |
| 1,358,885 | 11/1920 | Shimocuskies | 292/341.15 |
| 1,475,725 | 11/1923 | Steinmark | 292/169 |
| 1,747,092 | 2/1930 | Van Note | 292/DIG. 14 |
| 1,839,406 | 1/1932 | McLaughlin | 292/150 |
| 2,157,288 | 5/1939 | Gauss | 292/106 |
| 2,447,190 | 8/1948 | Lickteig | 292/169 |
| 2,576,635 | 11/1951 | Nottingham | 292/DIG. 4 |
| 2,644,706 | 7/1953 | McConnell | 292/150 |
| 2,663,585 | 12/1953 | Tye | 292/106 |
| 2,721,751 | 10/1955 | Nolritz | 292/169 |
| 3,112,309 | 11/1963 | Poe | 292/57 |
| 3,112,309 | 10/1979 | Fiscner et al. | 292/167 |
| 3,341,239 | 9/1967 | Wheeler | 292/139 |
| 3,699,788 | 10/1972 | Gerlach et al. | 292/139 |
| 4,179,143 | 12/1979 | Shy | 292/150 |
| 4,312,204 | 1/1982 | Davis | 292/167 |
| 4,318,557 | 3/1982 | Bourne et al. | 292/113 |
| 4,379,577 | 4/1983 | Robertson | 292/341.15 |
| 4,561,684 | 12/1985 | Marotto | 292/333 |

FOREIGN PATENT DOCUMENTS

| | | | |
|---|---|---|---|
| 353577 | 10/1957 | Italy | 292/144 |
| 111286 | 6/1967 | Norway | 292/150 |
| 13910 | 8/1916 | United Kingdom | 292/150 |

OTHER PUBLICATIONS

Avibank, "Sales Dwg.", #9081 for Latch-Tension Shear Positive Lock.

Primary Examiner—Gary L. Smith
Assistant Examiner—Eric K. Nicholson
Attorney, Agent, or Firm—Lyon & Lyon

[57] ABSTRACT

Latch mechanisms for latching two bodies in both tension and shear. A longitudinally extending latching bolt is associated with a latching assembly having an overcenter link mechanism controlled by a lever. The overcenter link mechanism includes a slot cooperating with a pin to provide two effective lengths to the fully extended linkage. A laterally extending notch provides a shoulder intermediate the ends of the slot to receive the pin. A keeper is slidably associated with a keeper assembly to engage a recess in the longitudinally extending bolt to prevent its withdrawal from the keeper assembly. A locking surface in the recess engages the keeper. A slide member may extend over the recess so that the keeper is selectively prevented from engaging the recess for purposes of retracting the bolt.

13 Claims, 3 Drawing Sheets

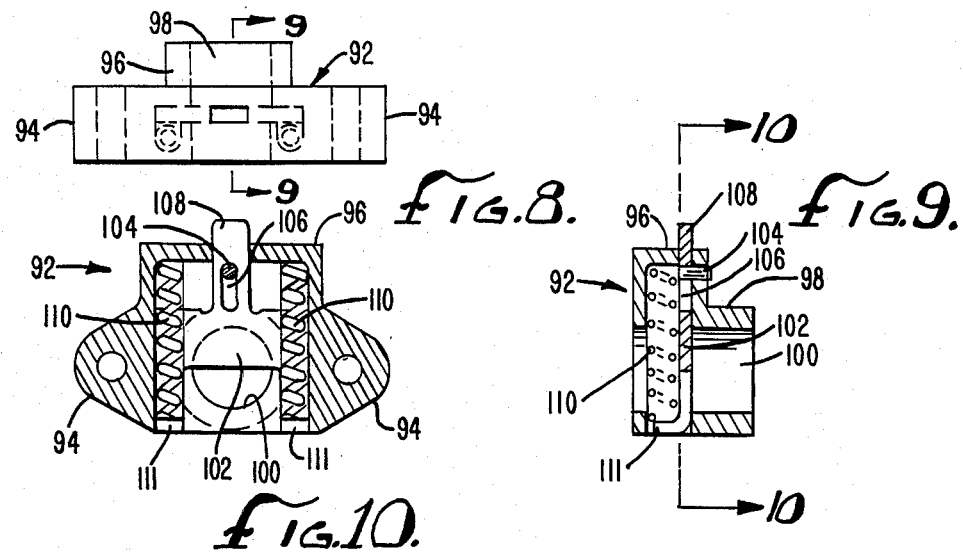
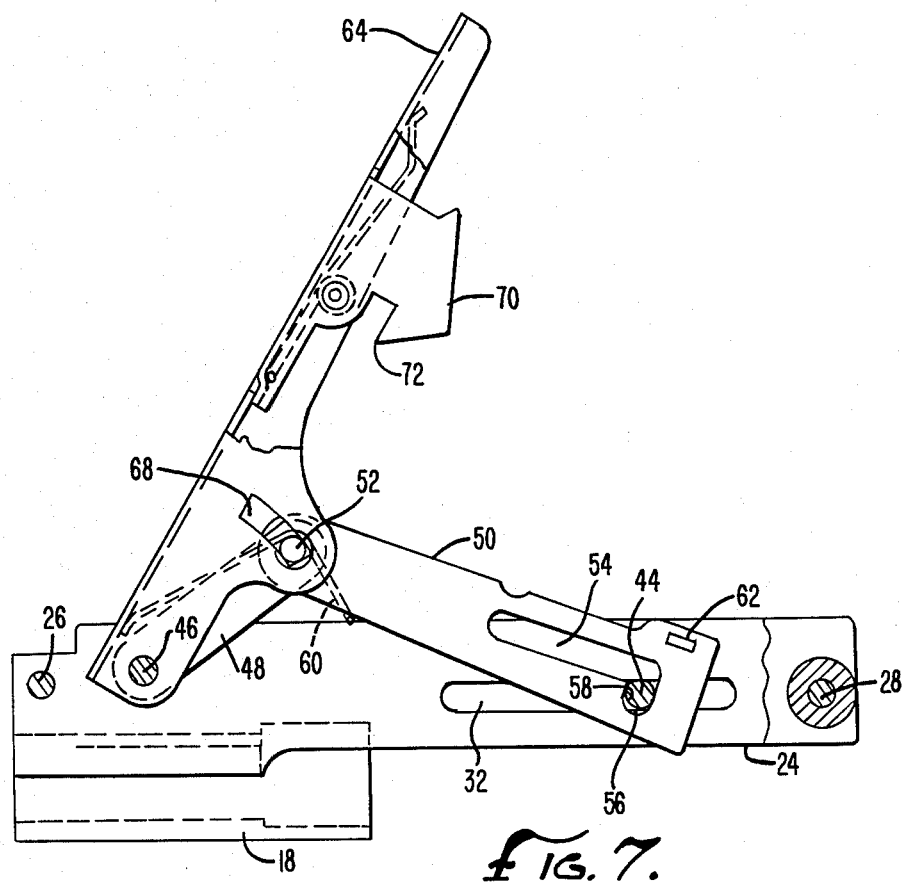

TENSION AND SHEAR LATCHING MECHANISM

BACKGROUND OF THE INVENTION

The field of the present invention is mechanisms for latching two bodies.

Latch mechanisms have generally been developed which either provide tension capabilities or shear capabilities. Latching devices exhibiting shear latching capabilities include deadbolt locks and the like which employ a longitudinally extending bolt associated with a first body and a bore or mortise associated with a second body to be latched to the first. The bolt moves longitudinally into the bore to then resist shearing movement perpendicular to the longitudinal direction of the bolt.

Tensioning latches typically incorporate a hook cooperating with a keeper, bar, shoulder or pin. A lever may be arranged cooperating with the hook to advance the hook beyond the keeper and retract the hook into tensioned engagement with the keeper. Overcenter linkage mechanisms may be employed to retain the lever with the hook in the tension condition. One such tension latch is illustrated in Bourne et al., U.S. Pat. No. 4,318,557.

Latching devices have been developed which provide both tensioning and shear capabilities in latching two adjacent bodies together. One such device is illustrated in Poe, U.S. Pat. No. 2,978,266. A complicated mechanical mechanism is employed to insert and retract a longitudinally extending latching bolt and rotate the latching bolt when arranged with a keeper such that the shank of the bolt resists shear and a head on the bolt provides an interlocking shoulder for supporting tension between the latch body and the keeper body.

In using such latching mechanisms, a variety of environments, conditions and requirements may be encountered. Latching mechanisms are employed, for example, in securing aircraft panels in place on the body of an aircraft. Under this and many other applications, the bodies or elements to be latched may not fall into place easily. It is not uncommon for an aircraft panel to require retention while a latching mechanism is secured. Under such conditions the operator is advantaged if two hands are not required to manipulate the latching mechanism. It is, therefore, advantageous when a latching mechanism may be fully manipulated, at least from the unlocked to the locked condition, with one hand. This allows the operator's other hand to be better employed in retaining the aircraft panel or other element in place during the latching operation.

Of course, actuation of a latching mechanism from the latched to the unlatched condition with one hand is also advantageous. Situations where the released panel or element must be restrained from rapidly or fully separating from the retaining body are easily envisioned. Under such situations, for example, single handed latch manipulation is advantageous.

SUMMARY OF THE INVENTION

The present invention is directed to a latching mechanism for latching two bodies together. The mechanism employs a keeper assembly mounted to one body and a latching bolt assembly mounted to the other. Through interaction between the keeper assembly and the latching bolt assembly, the latching mechanism may be latched or unlatched using one hand. Such operation frees an operator's other hand for use in locating, retaining or aligning one body relative to the other as may be needed during either latching or unlatching of such two bodies.

To accomplish the foregoing, the latching bolt assembly may include a latching bolt having an engaging recess therein and a control member to control access to the recess. The keeper assembly may then employ a member controlled by the control member which is capable of interlocking with the engaging recess. When engaged, the keeper member and the engaging recess cooperate to prevent retraction of the latching bolt. This mechanism may be used advantageously to provide latching in both tension and shear.

In a further aspect to the present invention, the engaging recess may include a surface inclined relative to the motion of the bolt. Selected motion of the bolt can then be employed to disengage the keeper from the bolt. The control member can then prevent reengagement until the bolt has been retracted from the keeper assembly to a substantial extent. A flag mechanism may also be employed to indicate when only partial engagement has been achieved.

The latch assemblies of the present invention find particular utility in flush-mounted configurations most useful for aircraft panels and the like. Certain aspects of the preferred embodiment allow for adjustment of the tension under load, indications of when the mechanism is not fully locked and a convenient lever mechanism for actuating the linkage mechanism.

Accordingly, it is an object of the present invention to provide an improved latch mechanism. Other and further objects and advantages will appear hereinafter.

BRIEF DESCRIPTION OF THE DRAWINGS

In the drawings, similar reference characters denote similar elements throughout the several views.

FIG. 7 is a side view of a latch assembly with a portion broken out to illustrate the handle linkage partially actuated.

FIG. 8 is a top view of a keeper assembly.

FIG. 9 is a sectional view of the keeper assembly taken through line 9—9 in FIG. 8.

FIG. 10 is a sectional view of the keeper assembly taken through line 10—10 in FIG. 9.

DETAILED DESCRIPTION OF THE PREFERRED EMBODIMENTS

Figure 3:
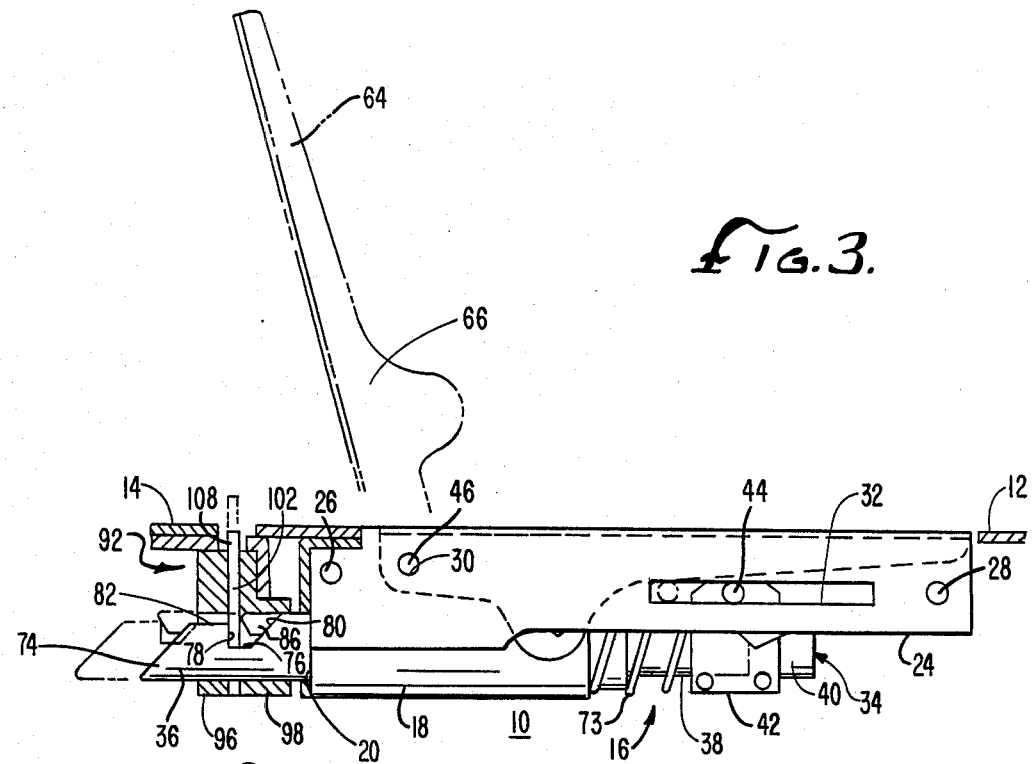
FIG. 3 is a side view of the latching mechanism illustrating a latching bolt assembly and a keeper assembly in latched engagement in full line and in an extended position of the latching bolt assembly in phantom line.

Turning to the drawings, a latch mechanism, generally designated 10 is illustrated. In FIG. 3, the latch mechanism 10 is shown to be in association with a first body 12 and a second body 14 arranged to be held together by the mechanism 10. Associated with the first body 12 is a latch assembly, generally designated 16, including a latch body 18 fixed to the first body 12. The body 18 includes a barrel 20 defining a central bore. The barrel 20 depends from and extends parallel to two side plates 24. The side plates 24 include holes 26 and 28 at the front and rear ends of the side plates, respectively, for receiving fasteners. The fasteners extend to the first body 12 to retain the latch body 18 and in turn the entire latch assembly 16 in place on the first body 12. Also extending through each of the plates 24 are holes 30 to receive a mounting pin further described below. Guide slots 32 extend longitudinally along a portion of the side plates 24.

The latch assembly 16 further includes a latching bolt assembly 34. The latching bolt assembly 34 is slidably mounted in the central bore to extend longitudinally through the barrel 20 for latching operation. The latching bolt assembly 34 includes a bolt head 36 having an internal bore 37 to receive an adjusting shaft 38 threaded at one end. The shaft 38 extends rearwardly to a head 40 which incorporates some means for permitting rotation of the adjusting shaft 38 to adjust the length of the overall latching bolt assembly 34. A conventional tool such as an Allen wrench may be employed with a hexagonal hole formed in the end of the head 40. A trunnion 42 is positioned on the adjusting shaft 38 and retained from sliding longitudinally thereon. The trunnion 42 extends upwardly above the latching bolt 34 to receive a pin 44. The pin 44 extends laterally through the trunnion 42 and into the guide slots 32 in the side plates 24. Adjustment to the adjusting shaft 38 by rotation thereof into and out of the bolt head 36 acts to vary the longitudinal dimension of the bolt between its head and the pin 44.

Extending through the holes 30 is another pin 46. The pin 46 is thus retained relative to the latch body 18. By comparison, the pin 44 and the latching bolt 34 associated therewith is able to move longitudinally in the slots 32. Linkage is provided which includes the two pins 44 and 46 to control and forcefully actuate the latching bolt 34 relative to the latch body 18. The linkage also includes a first link 48 defined by two link plates. The link plates of the link 48 are pivotally mounted about the pin 46 at one end thereof. A second link 50 defined by two link plates extends from a coupling with the pin 44. The link plates of the link 48 and the link plates of the link 50 are pinned together at one end of each by another pin 52. Thus linkage is provided between the latch body 18 through the pin 46, the link 48, the pin 52, the link 50 and the pin 44. The coupling between the pin 44 and the link 50 is accomplished by means of slots 54 located in each of the link plates of the second link 50. The slots 54 are of sufficient width to receive the pin 44 for sliding therealong. The slots 54 also include laterally extending notches 56 at one end thereof. The notches are also wide enough to receive the pin 44 and define a shoulder 58 intermediate the ends thereof against which the pin 44 may rest. A torsion spring 60 (illustrated in FIG. 7) coiled about the pin 46 with ends extending to bias the link 50 in a counterclockwise direction, as seen in FIG. 7, is employed such that the link 50 will move upwardly when the pin 44 reaches the lateral notch 56. This occurs at the orientation of the linkage as seen in FIG. 7. A bridge 62 extends between the link plates of the link 50 and forms a spot upon which one may physically overcome the spring 60 by pushing on the link itself. The links pivot relative to one another and are provided with sufficient clearance such that the links are able to swing overcenter to act as an overcenter lock mechanism.

To control the linkage, a lever 64 is provided. The lever 64 operates as a handle and includes a pair of side flanges 66 which extend downwardly to a pivotal mounting on the pin 46. The side flanges 66 are located outwardly of the links 48. The side flanges 66 also extend to and are coupled with the pin 52. The pin 52 is positioned within slots 68 in the side flanges 66. The slots 68 are arranged in an arc about the axis of the pin 46 such that the links 48 rather than the side flanges 66 accommodate the compression loads imposed on the overcenter link mechanism. The slots 68 are designed to provide some travel such that the lever 64 may be raised without having the linkage proceed overcenter. In this way, adjustments can be made to the adjusting shaft 38 while the latch remains in tensioned engagement. To retain the lever in the closed and locked position, a pivotal locking member 70 having a hook 72 is arranged to engage the pin 44 when the latching bolt 34 is in the locked position. The locking member 70 is pivotally mounted to the lever 64 with a latch release located in the center of the lever to be accessible from outside of the first body. A return spring 73 is positioned between the trunnion 42 and the latch body 18 to bias the entire latching bolt 34 toward the unlatched position.

The bolt head 36 of the latching bolt assembly 34 includes at its leading end an inclined or beveled surface 74. A recess 76 is located rearwardly of the beveled surface 74. The recess 76 includes a locking surface 78 substantially perpendicular to the longitudinal direction of the latching bolt assembly 34. In this case, the locking surface 78 is perpendicular thereto. The recess 76 further includes an inclined surface 80 opposite to the locking surface 78 in the recess 76. Extending between the beveled surface 74 and the locking surface 78 is a step 82. The step 82 is cut into the main cross-sectional dimension of the bolt head 36 such that the uppermost surface of the step 82 is lower than the uppermost surface of the bolt head 36 rearwardly of the inclined surface or ramp 80.

Figure 2:
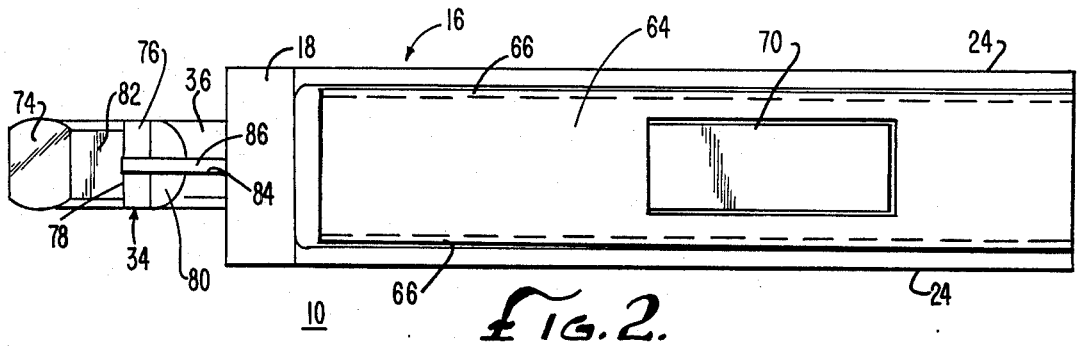
FIG. 2 is a top view of the latch mechanism of FIG. 1.
Figure 1:
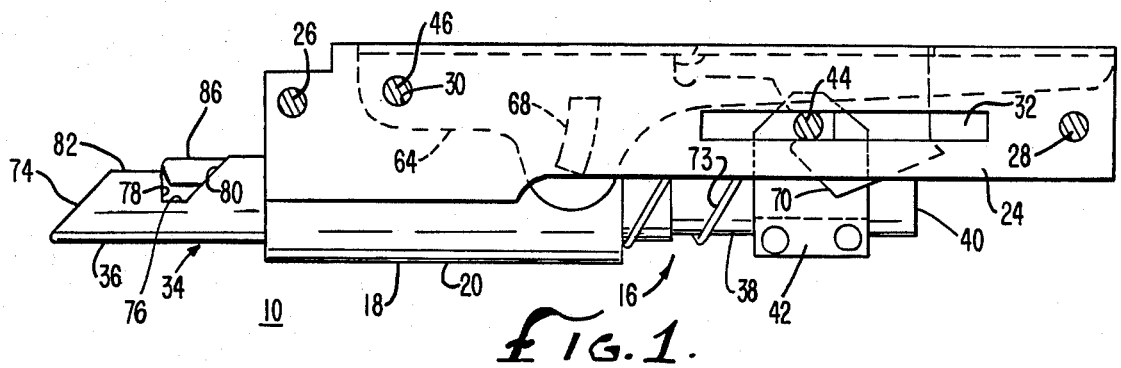
FIG. 1 is a side view of a latch mechanism constructed in accordance with the present invention.
Figure 5:
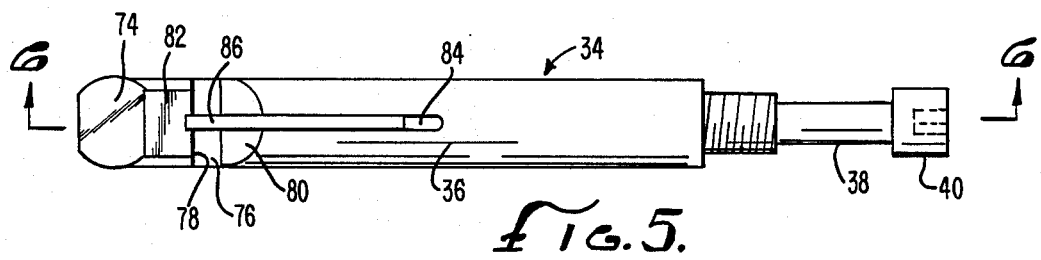
FIG. 5 is a plan view of the latching bolt assembly.
Figure 6:
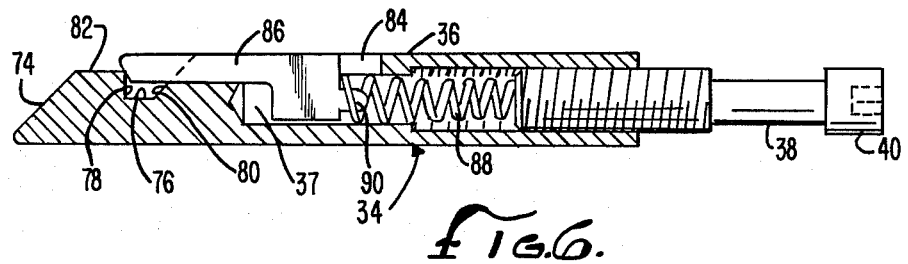
FIG. 6 is a sectional view taken through section 6—6 in FIG. 5.

Disposed longitudinally in the bolt head 36 is a slot 84 which is cut through the inclined surface 80 rearwardly to a point in full communication with the bore 37. Located in the slot 84 is a slide member 86 which extends forwardly to abut against the outer edge of the locking surface 78. The slide member 86 extends rearwardly and downwardly into the bore 37 in the bolt head 36 as can best be seen in FIG. 6. Located within the bore 37 is a compression spring 88. The spring extends between the end of the adjusting shaft 38 and the back end of the slide member 86. A protrusion 90 on the slide member 86 orients the spring 88 relative to the slide member 86. The spring 88 biases the slide member 86 against the locking surface 78. Sufficient room is provided in the slot 84 to allow the slide member 86 to be retracted in the longitudinal direction of the latching bolt assembly 34 such that the front end of the slide member 86 does not protrude from the inclined surface 80 to any significant extent when in the retracted position.

A keeper assembly, generally designated 92, is associated with the second body where it is fixed by means of attachment points 94 as seen in FIG. 10. The keeper assembly 92 includes a keeper body 96. The keeper body 96 includes a barrel 98 having a bore 100 therethrough. The bore 100 is designed to receive and slidably support the latching bolt 34. The cooperation of the bore on the latch body 14 and the bore 100 on the keeper body 96 provides the support for transmitting shear loads through the latching bolt 34.

A keeper 102 is slidably positioned in the keeper body 96 to slide into and out of engagement with the recess 76. A pin 104 helps guide and limit the movement of the keeper 102 through engagement with a small slot 106. The keeper 102 extends upwardly in a flag 108 to extend outwardly from the upper surface of the keeper body 96. Springs 110 bias the keeper 102 toward engagement with the latching bolt assembly 34 through flanges 111.

Figure 4:
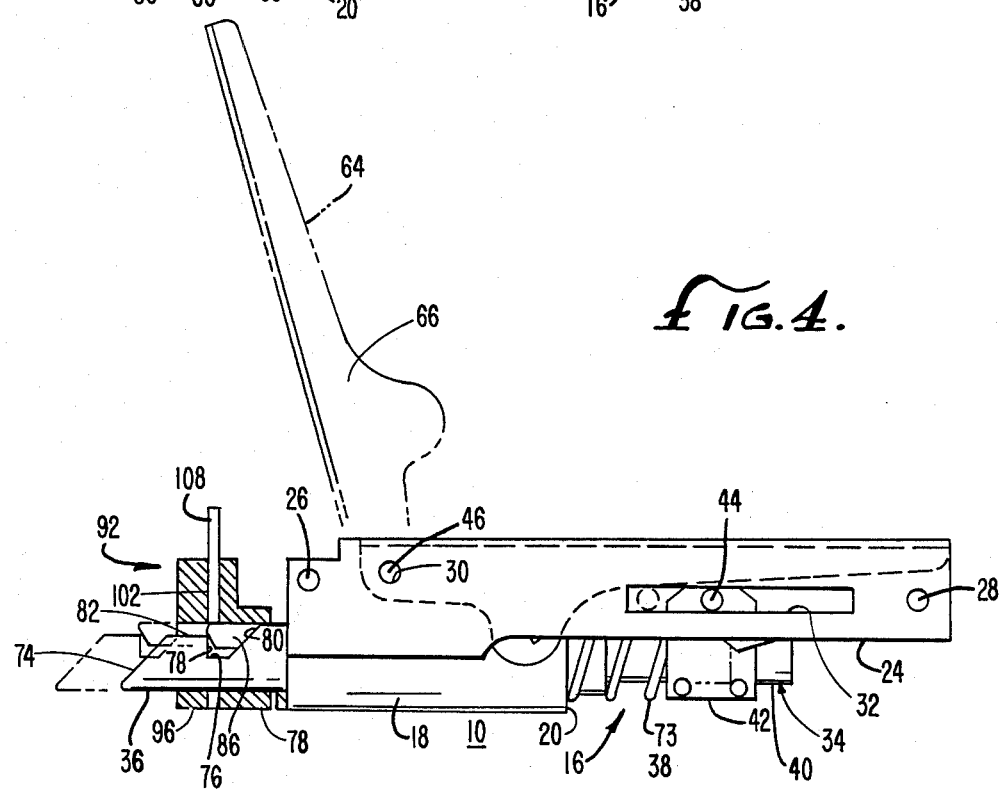
FIG. 4 is a side view of the latch mechanism shown in FIG. 3 illustrating the latching bolt assembly in the extended position in phantom line and in a position for retraction thereof in full line.

FIG. 7 illustrates the latch mechanism in operation. FIGS. 3 and 4 illustrate the operation of the bolt assembly 34. As can be seen, the keeper 102 engages the locking surface 78 on the latching bolt assembly 34. In the locked condition, the first link 48 and the second link 50 are arranged overcenter such that the two links form an obtuse angle toward the lever 64. The adjusting shaft 38 is set such that the links 48 and 50 are in compression. Consequently, the latch body 18 holds the links 48 and 50 in compression which in turn act against the pin 44 to stress the pin away from the keeper assembly 92. This places the latching bolt 34 in tension. The latching bolt 34 then acts as a tension latching mechanism in conjunction with the interlocked keeper 102. The lever 64 is also held in a flush condition with the first body 12 by means of the locking member 70. The hook 72 thereof is held in place by the pin 44. In this locked and closed position, the pin 44 is located at one end of the slot 54, the end closest to the anchoring pin 46 fixed to the latch body 18. Thus, the linkage between the anchor point at the pin 46 and the trunnion 42 is at its minimum while in the extended position.

To open the latch from the locked condition described above, the latch release is pivoted by depressing one end thereof lying in the upper plane of the lever 64. This rotates the locking member 70 to unhook the hook 72 from the pin 44. The spring 60 or other convenient biasing means then acts to lift the lever 64 such that it may be manually gripped to function as a handle. The lever 64 is able to rotate upwardly to a certain extent without affecting the overcenter condition of the links 48 and 50 because of the slot 68. With the lever 64 slightly raised, access is available to the adjusting shaft 38 for adjustment with the latch under load. Once the lever 64 has been raised to the point where the slot 68 encounters the pin 52, the lever 64 may be gripped and rotated upwardly and toward the keeper assembly. This rotates the linkage defined by the links 48 and 50 through a center position such that the angle between the links 48 and 50 then becomes obtuse on the bottom side of the links. As the lever 64 continues to rotate, tension is released on the latching bolt assembly 34; but the bolt is not drawn in either direction because the second link 50 is being drawn such that the pin 44 rides in the slot 54 to the end most distant from the anchoring pin 46. Once the link 50 progresses through rotation of the lever 64 to the point where the distant end of the slot 54 is reached, the spring 60 rotates the link 50 upwardly such that the pin 44 comes to reside in the lateral notch 56. Continued rotation of the lever 64 then draws the latching bolt assembly 34 further toward the keeper assembly 92.

Starting from the locked position the keeper 102 extends into the recess 76 where it is biased by the springs 110. The slide member 86 is slid away from the locking surface 78 to make room for the keeper 102. Under these conditions, drawing the latching bolt assembly 34 further toward the keeper assembly causes the keeper 102 to ride up on the inclined surface 80 and to force the slide member 86 further into the slot 84. When the keeper 102 reaches the top of the inclined surface 80, the slide member 86 falls beneath the keeper 102 and is biased by the comrpession spring 88 outwardly against the locking surface 78.

To continue the unlatching process, the lever 64 is then moved back toward the closed position. With the keeper 102 retracted by the slide member 86, the latching bolt 34 is free to be withdrawn from the keeper assembly 92. The linkage is now arranged with the pin 44 located in the lateral notch 56. As the lever 64 is moved away from the keeper assembly 92, the pin 44 abuts up against the shoulder 58 of the lateral notch 56 to drive the latching bolt 34 away from the keeper assembly 74. In this condition, the linkage has its effective full length when extended because the shoulder 58, located intermediate the ends of the slot 54 retains the pin 44 at the end of the slot most distant from the anchoring pin 46. With full rotation of the lever 64, the latching bolt 34 is fully extracted from the keeper assembly 92.

To latch the mechanism, assuming that the latching bolt 34 is in its fully retracted position, the lever 64 is rotated upwardly and toward the keeper assembly 92. The pin 44 remains at the distant end of the slot 54. With rotation of the lever 64 toward the keeper assembly 92, the latching bolt 34 comes to an extended position as seen in full line in FIGS. 3 and 4. As the latching bolt assembly 34 is positioned for latching of the mechanism, it is advanced until the keeper 102 rides up over the beveled surface 74 and the step 82 falls into the recess 76. To do so, the keeper pushes the slide member 86 rearwardly. The locking of the mechanism is recognized by the disappearance of the flag 108 as the keeper 102 drops into the recess 76.

The lever 64 is prevented from rotating fully away from the keeper assembly 92 until the second link 50 is manually depressed to disengage the pin 44 from the lateral notch 56. Once disengaged, the second link 50 moves relative to the pin 44 along the slot 54. Once the pin 44 comes to the end of the slot 54 closest to the anchoring pin 46, the linkage forces the pin 44 and the associated latching bolt 34 toward the right. As the latching bolt 34 is already engaged with the keeper 102, further movement of the latching bolt 34 away from the keeper assembly 92 is prevented. With proper adjustment, the latching bolt 34 is then appropriately tensioned as the links 48 and 50 proceed overcenter to the locked condition. Further movement of the lever 64 then engages the hook 72 over the pin 44 to retain the lever 64 in the fully closed position.

Accordingly, improved latching mechanisms are disclosed useful for latching in both tension and shear. While embodiments and applications of this invention have been shown and described, it would be apparent to those of ordinary skill in the art that many more modifications are possible without departing from the inventive concepts herein. Thus, the invention is not to be limited except in the spirit of the appended claims.

What is claimed is:

1. A mechanism for latching a first body to a second body, comprising
   a latch assembly including a latch body fixedly attachable to a first body, and a latching bolt assembly slidably mounted in said latch body to slide in a longitudinal direction of said latching bolt assembly, said latching bolt assembly including an extendable portion which extends outward from said latch body, said extendable portion including a recess having an inwardly facing locking surface at a substantial angle to the longitudinal direction of said latching bolt assembly;

a keeper assembly to receive said latching bolt assembly, said keeper assembly being fixedly attachable to a second body and including a keeper body having a keeper movably mounted in said keeper body and extendable to interlock with said locking surface of said latching bolt assembly; and a slide member slidably mounted without said latching bolt assembly and resiliently biased to extend over said recess.

2. The mechanism of claim 1 wherein said recess includes an inclined surface relative to the longitudinal direction of said latching bolt assembly facing said locking surface.

3. The mechanism of claim 1 wherein said locking surface is perpendicular to the longitudinal direction of said latching bolt assembly.

4. The mechanism of claim 1 wherein said recess has a second surface facing said locking surface, said slide member extending outwardly from said second surface to said locking surface and extending radially outward of said locking surface on said latching bolt assembly.

5. The mechanism of claim 1 wherein said keeper is resiliently biased toward said recess.

6. The mechanism of claim 1 further comprising linkage coupled with said latch body and said latching bolt assembly constructed and arranged to selectively advance said latching bolt assembly such that said recess extends past said keeper in said keeper assembly and selectively retracts said latching bolt assembly from said keeper assembly.

7. A mechanism for latching a first body to a second body, comprising a latch assembly including a latch body fixedly attachable to a first body and a latching bolt assembly slidably mounted in said latch body to slide in the longitudinal direction of said latching bolt assembly, said latching bolt assembly including an extendable portion which extends outward from said latch body, said extendable portion including a recess having an inwardly facing locking surface at a substantial angle to the longitudinal direction of said latching bolt assembly and an inclined surface relative to the longitudinal direction of said latching bolt assembly facing said locking surface;

a keeper assembly to receive said latching bolt assembly, said keeper assembly being fixedly attachable to the second body and including a keeper body having a keeper movably mounted in said keeper body and extendable to interlock with said locking surface of said latching bolt assembly; and a slide member slidably mounted within said latching bolt assembly and resiliently biased to extend over said recess, said slide member extending outwardly from said inclined surface to said locking surface and extending radially outward of said locking surface on said latching bolt assembly.

8. The mechanism of claim 7 wherein said locking surface is perpendicular to the longitudinal direction of said latching bolt assembly.

9. The mechanism of claim 7 wherein said keeper is resiliently biased toward said recess.

10. A mechanism for latching a first body to a second body, comprising a latch assembly including a latch body fixed to the first body and a latching bolt assembly slidably mounted in said latch body to slide in the longitudinal direction of said latching bolt assembly, said latching bolt assembly including an extendable portion which extends outward from said latch body, said extandably portion including a recess having an inwardly facing locking surface at a substantial angle to the longitudinal direction of said latching bolt assembly and an inclined surface relative to the longitudinal direction of said latching bolt assembly facing said locking surface;

a keeper assembly to receive said latching bolt assembly, said keeper assembly being fixedly attachable to a second body and including a keeper body having a keeper movably mounted in said keeper body and extendable to interlock with said locking surface of said latching bolt assembly;

a slide member slidably mounted within said latching bolt assembly and resiliently biased to extend over said recess, said slide member extending outwardly from said inclined surface to said locking surface and extending radially outward of said locking surface on said latching bolt assembly; and linkage coupled with said latch body and said latching bolt assembly constructed and arranged to selectively advance said latching bolt assembly such that said recess extends past said keeper in said keeper assembly and selectively retracts said latching bolt assembly from said keeper assembly.

11. The mechanism of claim 10 wherein said locking surface is perpendicular to the longitudinal direction of said latching bolt assembly.

12. The mechanism of claim 10 wherein said keeper is resiliently biased toward said recess.

13. A mechanism for latching a first body to a second body, comprising a latch assembly including a latch body fixedly attachable to a first body and a latching bolt assembly slidably mounted in said latch body to slide in the longitudinal direction of said latching bolt assembly, said latching bolt assembly including an extendable portion which extends outward from said latch body, said extendable portion including a recess having an inwardly facing locking surface perpendicular to the longitudinal direction of said latching bolt assembly and an inclined surface relative to the longitudinal direction of said latching bolt assembly facing said locking surface;

a keeper assembly to receive said latching bolt assembly, said keeper assembly being fixedly attachable to a second body including a keeper body having a keeper movably mounted in said keeper body and extendable to interlock with said locking surface of said latching bolt assembly, said keeper being resiliently biased toward said recess;

a slide member slidably mounted within said latching bolt assembly and resiliently biased to extend over said recess, said slide member extending outwardly from said inclined surface to said locking surface and extending radially outward of said locking surface on said latching bolt assembly; and linkage coupled with said latch body and said latching bolt assembly constructed and arranged to selectively advance said latching bolt assembly such that said recess extends past said keeper in said keeper assembly and selectively retracts said latching bolt assembly from said keeper assembly.

* * * * *